(12) United States Patent
Toyoshima (10) Patent No.: US 11,971,545 B2
(45) Date of Patent: Apr. 30, 2024

(54) VEHICULAR DISPLAY DEVICE

(71) Applicant: KOITO MANUFACTURING CO., LTD., Tokyo (JP)

(72) Inventor: Takanobu Toyoshima, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 18/000,411

(22) PCT Filed: May 21, 2021

(86) PCT No.: PCT/JP2021/019357
§ 371 (c)(1),
(2) Date: Dec. 1, 2022

(87) PCT Pub. No.: WO2021/246201
PCT Pub. Date: Dec. 9, 2021

(65) Prior Publication Data
US 2023/0221553 A1 Jul. 13, 2023

(30) Foreign Application Priority Data
Jun. 5, 2020 (JP) ................. 2020-098086

(51) Int. Cl.
*G02F 1/1333* (2006.01)
*B60K 35/00* (2006.01)
(Continued)

(52) U.S. Cl.
CPC .......... *G02B 27/0101* (2013.01); *B60K 35/00* (2013.01); *G02F 1/133385* (2013.01);
(Continued)

(58) Field of Classification Search
CPC .................................................. G02F 1/1333
See application file for complete search history.

(56) References Cited

U.S. PATENT DOCUMENTS

2013/0265646 A1* 10/2013 Sakai .................. G02B 27/01
359/630
2018/0259807 A1* 9/2018 Yuuki ............... G02F 1/133385
(Continued)

FOREIGN PATENT DOCUMENTS

JP  2005-003918 A  1/2005
JP  2009-288484 A  12/2009
(Continued)

OTHER PUBLICATIONS

European Search Report dated Oct. 13, 2023 for the corresponding European Patent Application No. 21816727.8.
(Continued)

*Primary Examiner* — Sang V Nguyen
(74) *Attorney, Agent, or Firm* — Pearne & Gordon LLP (57) ABSTRACT

There is provided a small-sized HUD device having a high image display reliability and a high thermal reliability. A HUD device 1 includes: an image display unit 2 including a display panel (liquid crystal panel) 22 that displays an image, and an optical system 3 that projects image light of the displayed image onto a windshield of a vehicle, in which a virtual image of the image is visually recognized by light reflected off the windshield. In the image display unit 2, an effective display region 22*a* that displays the image is set to a region on a side close to one end of the display panel 22. The optical system 3 includes a first reflector 31 that reflects the image light emitted from the image display unit 2 and a second reflector 32 that reflects the reflected light of the first reflector 31 toward the windshield. The image display unit 2 is disposed to face the first reflector 31, and the display panel 22 is disposed in an attitude in which the one end faces the second reflector 32 side.

12 Claims, 7 Drawing Sheets

(51) Int. Cl.
  *G02B 27/01*  (2006.01)
  *G02F 1/157*  (2006.01)
  *B60K 35/23*  (2024.01)
(52) U.S. Cl.
  CPC .............. *G02F 1/157* (2013.01); *B60K 35/23* (2024.01); *B60K 2360/23* (2024.01); *B60Y 2304/01* (2013.01)

(56) References Cited

U.S. PATENT DOCUMENTS

2019/0033584 A1*  1/2019  Aoki ................. G02B 27/0172
2020/0041847 A1*  2/2020  Kobayashi ............ G02B 19/00

FOREIGN PATENT DOCUMENTS

| | | | | |
|---|---|---|---|---|
| JP | 2009288484 | * | 12/2009 | ........... G02F 1/1333 |
| JP | 2013-174855 A | | 9/2013 | |
| JP | 2015-087422 A | | 5/2015 | |
| JP | 2015087422 | * | 5/2015 | ............. G02B 27/02 |
| JP | 2018-174583 A | | 11/2018 | |
| JP | 2019-105785 A | | 6/2019 | |

OTHER PUBLICATIONS

International Search Report dated Aug. 10, 2021 filed in PCT/JP2021/019357.

* cited by examiner

VEHICULAR DISPLAY DEVICE

TECHNICAL FIELD

The present invention relates to a display device equipped on a vehicle such as an automobile, and more specifically to a head-up display device (in the following, an HUD device).

BACKGROUND ART

As the HUD device, there is proposed a device in which light forming an image is projected onto the windshield of an automobile such that an occupant such as a driver can visually recognize a virtual image of the image with the reflected light. Note that in the following, making a virtual image visible is also referred to as displaying an image. Patent Literature 1 proposes an HUD device in which light (in the following, image light) of an image displayed on a display unit such as a liquid crystal panel is sequentially reflected off a plane mirror and a concave mirror and projected onto the windshield of an automobile to visually recognize a virtual image.

In this type of HUD device, in order to configure the size of an image to be displayed, i.e., the size of a virtual image to be a certain size, it is necessary to set the focal length of the concave mirror that creates the virtual image to a length correspondingly. In Patent Literature 1, image light of the display unit is once reflected off the plane mirror, and thus the size of the HUD device, specifically, the length of the concave mirror in the optical axis direction can be shortened, and a small-sized HUD device can be configured. Note that a configuration using a convex mirror instead of the plane mirror is also proposed.

CITATION LIST

Patent Literature

Patent Literature 1: JP-A-2018-174583

SUMMARY OF INVENTION

Problems to be Solved by Invention

In order to further downsize the HUD device of Patent Literature 1, it is necessary to dispose the display unit, the plane mirror, and the concave mirror as close as possible. However, since the HUD device of Patent Literature 1 has a configuration in which the optical path of the image light from the display unit to the windshield is bent in a folded state along the front-rear direction of the automobile by the plane mirror and the concave mirror, a part of the image light reflected off the plane mirror may be shielded by the display unit. In addition, a part of the image light reflected off the concave mirror may be shielded by the plane mirror.

As described above, when a part of the image light is shielded, the shielded image light is not projected onto the windshield, a part of the image is not displayed, and the display quality of the image on the HUD device is degraded. In addition, the display unit and the plane mirror may be heated by the shielded light. Specifically, in the case in which the display unit includes a liquid crystal device, the liquid crystal device is likely to be thermally damaged by heat generated by a light source that emits image light from the liquid crystal device, and the heat resistance of the HUD device is reduced.

An object of the present invention is to provide a small-sized HUD device having a high image display quality and a high heat resistance.

Solution to Problems

The present invention is a vehicle display device including: an image display unit including a display panel that displays an image; and an optical system that projects image light of the displayed image onto a windshield of a vehicle, in which a virtual image of the image is visually recognized by light reflected off the windshield. In the image display unit, an effective display region in which the image is displayed is set to a region on a side close to one end of the display panel.

In a preferred embodiment of the present invention, the optical system includes: a first reflector that reflects image light emitted from the image display unit; and a second reflector that reflects reflected light of the first reflector toward the windshield, and an optical path of image light from the image display unit to the second reflector is set in a folded state. In addition to this, the image display unit is disposed to face the first reflector, and the display panel is disposed in an attitude in which one end of the display panel faces the second reflector side.

As a preferred embodiment of the image display unit in the present invention, the display panel is formed of a transmissive liquid crystal panel, the liquid crystal panel is supported by a case, and a light source for a liquid crystal panel backlight and a heat sink are placed in the case. In addition to this, in the display panel, the ineffective display region except the effective display region is thermally coupled to the heat sink.

Effects of Invention

According to the present invention, there is provided a high quality, small-sized vehicle display device capable of preventing image light that is emitted from an image display unit from being shielded, and capable of displaying a suitable image. In addition, according to the present invention, there is provided a vehicle display device having a high heat resistance and an enhanced heat dissipation effect in an image display unit.

BRIEF DESCRIPTION OF DRAWINGS

FIG. 7 shows schematic side views of the HUD device, (a) is a first reference example and (b) is a second reference example;

DESCRIPTION OF EMBODIMENTS

Figure 1:
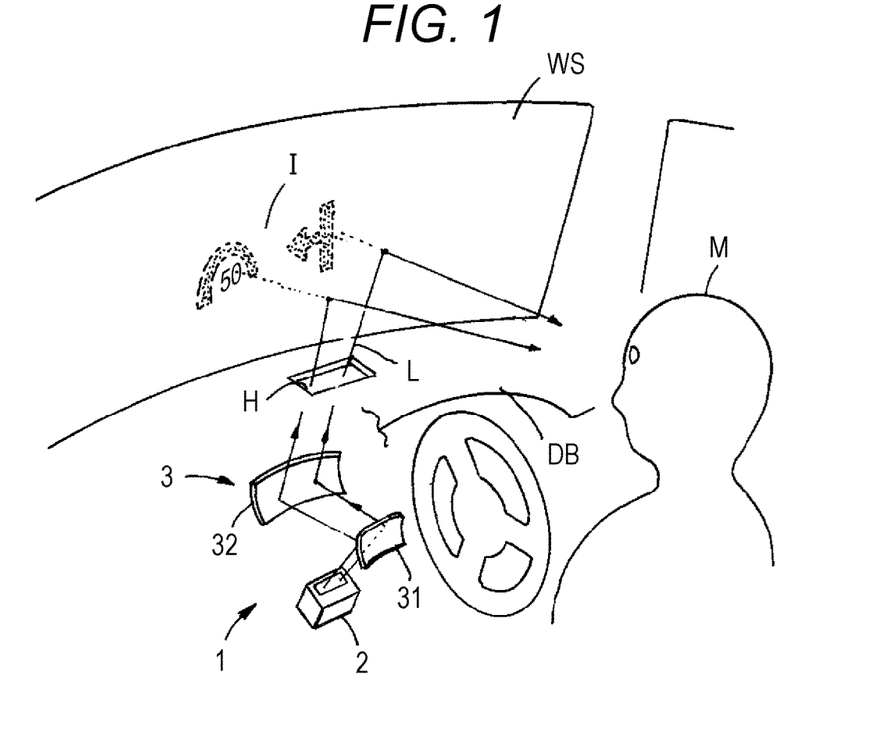
FIG. 1 is a conceptual configuration diagram of an HUD device.

Next, an embodiment of the present invention will be described with reference to the drawings. FIG. 1 is a conceptual configuration diagram of an HUD device 1 applied to an automobile. The HUD device 1 is placed in a dashboard DB of an automobile, and image light L emitted from the HUD device 1 is projected onto a windshield (referred to as a windshield) WS of the automobile through an upper surface opening H of the dashboard DB. The projected image light L is reflected off the windshield WS and directed to an occupant M such as a driver of the automobile. When the image light L enters the eyes of the occupant M, the occupant M can visually recognize the virtual image I by the image light at the front position of the automobile through the windshield WS, and the image is displayed. In this example, as the image to be displayed, a speedometer image and a navigation image are displayed side by side in the left-right direction. Note that in the following, the up-down direction and the front-rear direction respectively indicate the up-down direction and the front-rear direction based on the automobile.

Figure 2:
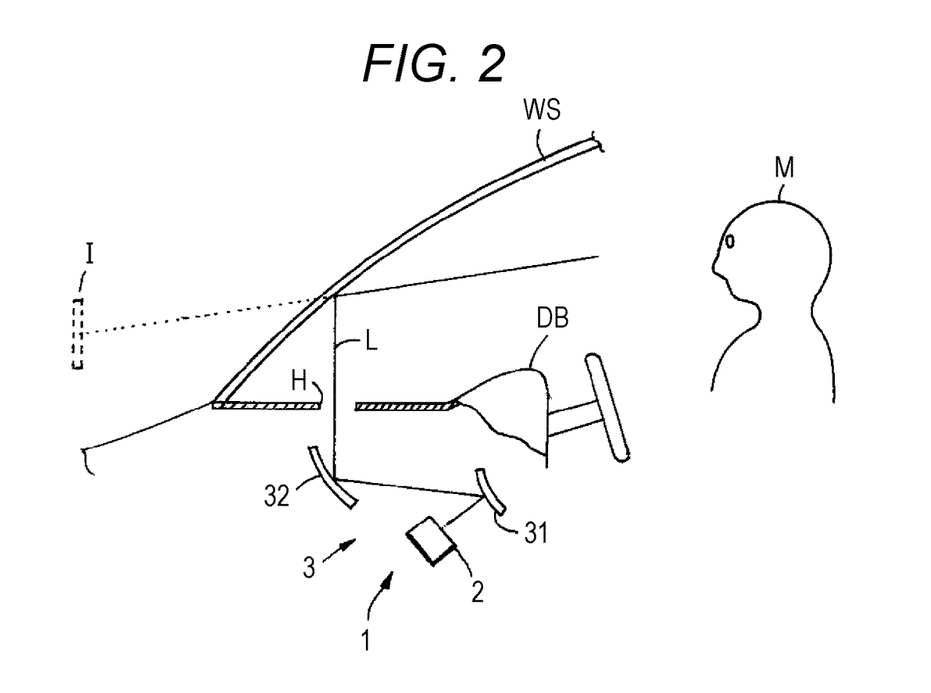
FIG. 2 is a schematic view of the HUD device viewed from the side.

FIG. 2 shows a schematic view of the HUD device 1 viewed from a side direction. The HUD device 1 includes an image display unit 2 and an optical system 3 that projects an image displayed on the image display unit 2 onto the windshield WS. The image display unit 2 includes a display panel, which will be described later, and displays an image on the image display surface of the display panel. The optical system 3 includes a first reflector 31 that reflects the image light L of the image displayed on the image display unit 2, and a second reflector 32 that further reflects the light reflected off the first reflector 31 and projects the light onto the windshield WS. The first reflector 31 is formed of a convex mirror, and the second reflector 32 is formed of a concave mirror.

The concave mirror 32 includes a spherical surface, an aspherical surface, or a free-form surface having a curvature that achieves a required focal length. The convex mirror 31 is provided to improve aberration in the concave mirror 32 and to substantially extend the focal length of the concave mirror 32. The HUD device 1 is configured such that the image displayed on the image display unit 2 is disposed within the focal length of the concave mirror 32, and thus the occupant M can visually recognize the virtual image I of the displayed image.

Figure 3:
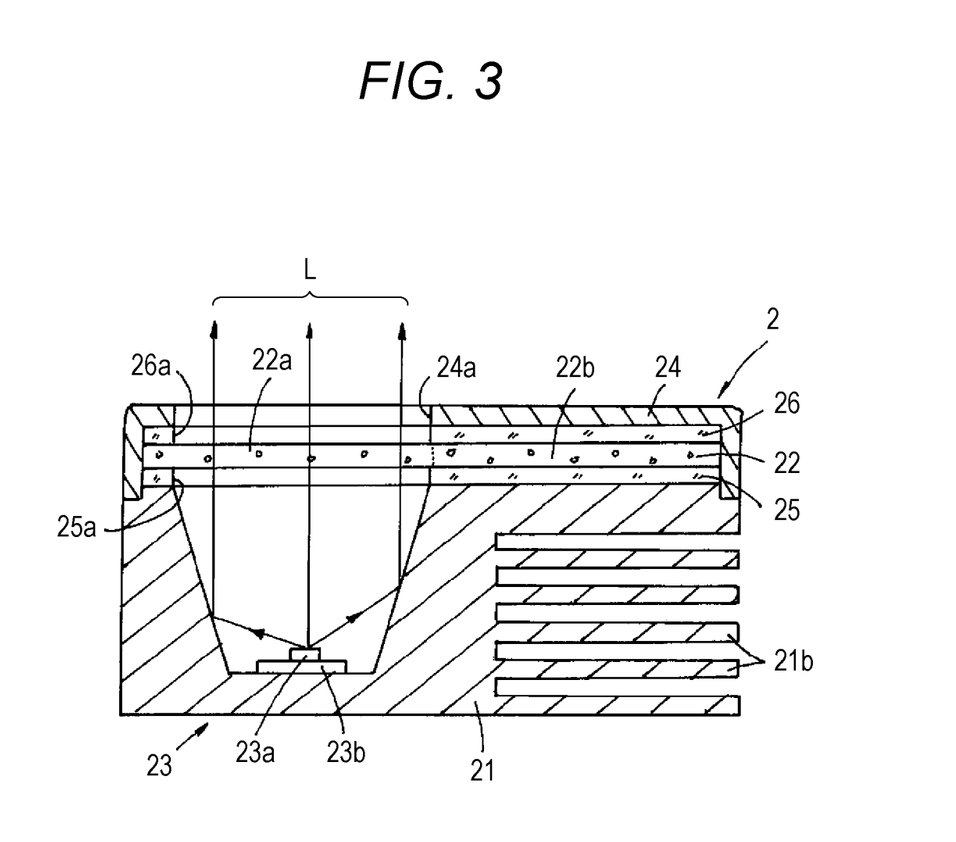
FIG. 3 is a longitudinal sectional view of an image display unit.
Figure 4:
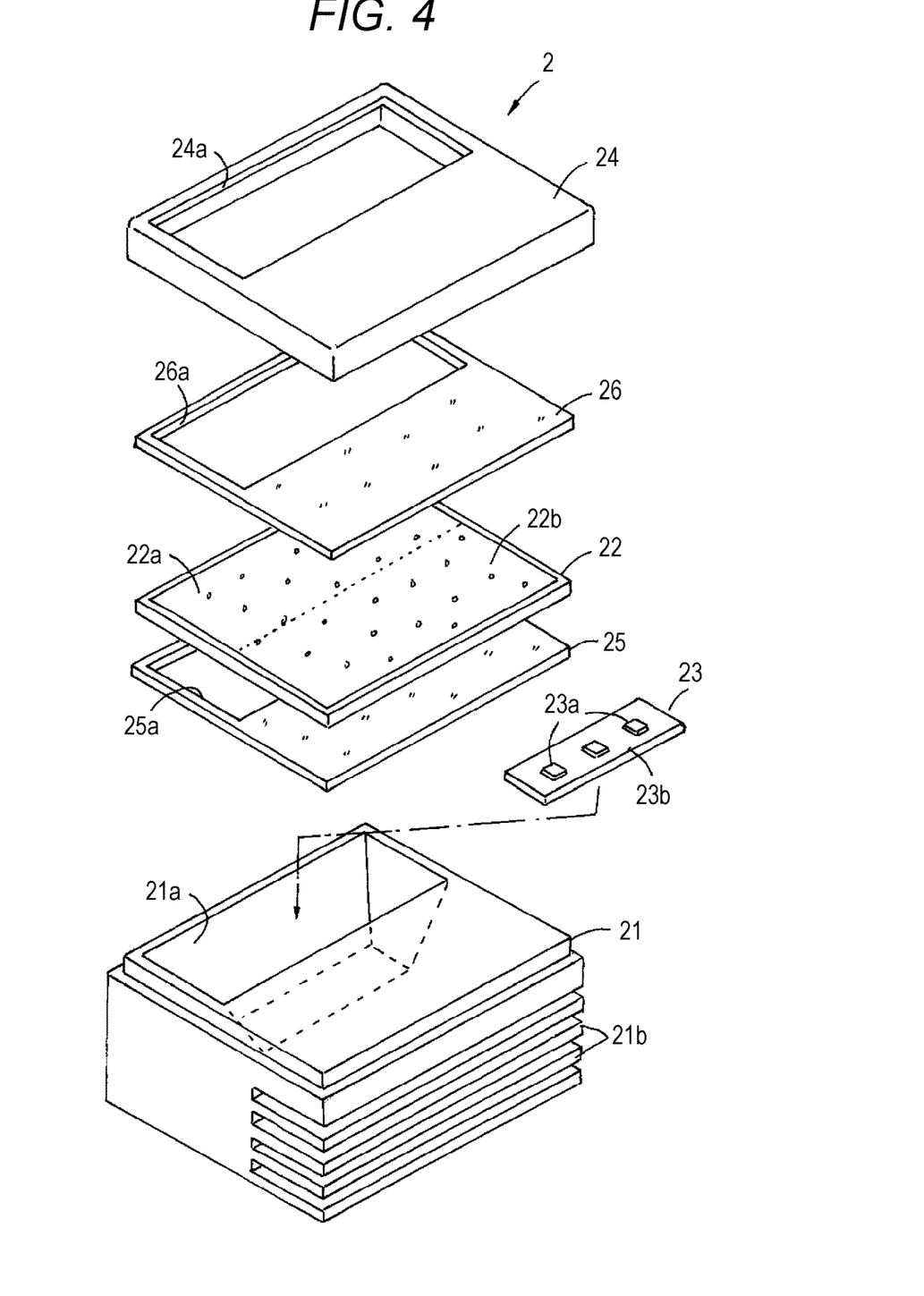
FIG. 4 is a schematic partially exploded perspective view of the image display unit.
Figure 5:
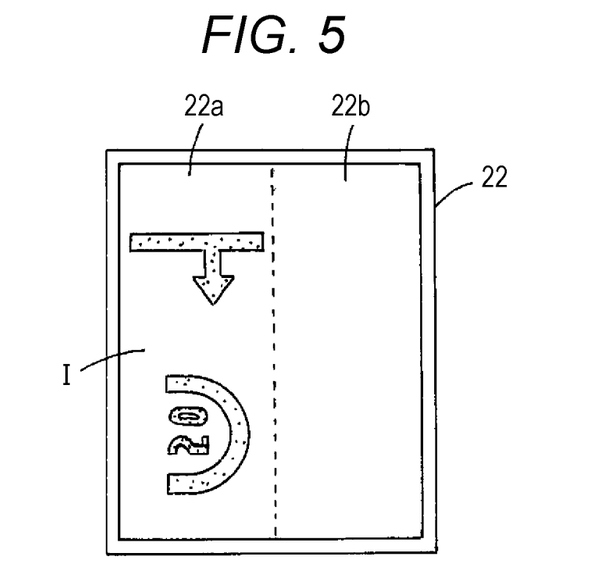
FIG. 5 is a plan view of a liquid crystal panel.

FIG. 3 is a cross-sectional view showing a schematic configuration of the image display unit 2, and FIG. 4 is an exploded perspective view of the schematic configuration. The image display unit 2 includes a case 21 formed of a member having a high thermal conductivity, and a transmissive liquid crystal panel 22 as a display panel is supported on at least a part of the upper surface of the case 21. As the image display surface of the liquid crystal panel 22 is schematically shown in FIG. 5, a part of the region of the image display surface is set as an effective display region 22a. That is, since the aspect ratio of the image display surface of the liquid crystal panel 22 is different from the aspect ratio of the image I displayed through the windshield WS shown in FIG. 1, a region corresponding to the aspect ratio of the image I in the entire region of the image display surface is set as the effective display region 22a, and the image I is displayed in the effective display region 22a.

In this embodiment, since the aspect ratio of the image display surface of the liquid crystal panel 22 is 3:4, whereas the aspect ratio of the image to be displayed is substantially 1:2, a region satisfying the aspect ratio of the image is set as the effective display region 22a. In addition, since the left direction of the liquid crystal panel 22 corresponds to the lower part of the image displayed in FIG. 5, the left side of the liquid crystal panel 22 is set as the screen downward direction. Therefore, the effective display region 22a is set to a region on the side close to the left end in FIG. 5, i.e., a region on the side close to one end corresponding to the lower side of the screen of the liquid crystal panel 22. A region on the right side from the effective display region 22a of the liquid crystal panel 22 is set as an ineffective display region 22b that does not contribute to image display.

The case 21 includes a light source chamber 21a in which a region corresponding to the effective display region 22a of the liquid crystal panel 22 is recessed downward from the upper surface, and a backlight source 23 is placed on the inner bottom surface of the light source chamber 21a. The backlight source 23 includes a circuit board 23b on which a light emitting diode (LED) 23a is mounted, and white light emitted when the LED 23a emits light is projected onto the back surface side of the liquid crystal panel 22. The inner wall surface of the light source chamber 21a is inclined so as to spread from the LED 23a toward the liquid crystal panel 22, and the white light of the LED 23a is reflected off the inner wall surface to be directed toward the liquid crystal panel 22. The white light projected onto the liquid crystal panel 22 is transmitted through the liquid crystal panel 22 and emitted as image light having a required hue.

The liquid crystal panel 22 is placed on the upper surface of the case 21, and then fixed to the case 21 with a cover 24 laid so as to cover the liquid crystal panel 22 from above. The cover 24 is provided with an opening window 24a through which the effective display region 22a of the liquid crystal panel 22 is partially exposed, and is attached so as to cover another region including the ineffective display region 22b such that its peripheral edge is fitted to the case 21.

Between the case 21 and the liquid crystal panel 22 and between the liquid crystal panel 22 and the cover 24, heat transfer sheets 25 and 26 formed of an elastic material having a high thermal conductivity are provided, respectively. In the heat transfer sheets 25 and 26, opening windows 25a and 26a through which the effective display region 22a is exposed are formed. In addition, each of the heat transfer sheets 25 and 26 equalizes an external force applied to the liquid crystal panel 22 by its own elasticity, and prevents a partial stress, which is likely to cause mechanical damage to the liquid crystal panel 22, from occurring. The heat transfer sheets 25 and 26 are placed in the peripheral edge region of the liquid crystal panel 22 and the region of the ineffective display region 22b excluding the effective display region 22a.

Furthermore, in the case 21, a plurality of heat dissipation fins 21b is formed on the outer wall surface of a part excluding the light source chamber 21a, and heat generated in the case 21, specifically, heat generated in the LEDs 23a and heat generated in the liquid crystal panel 22 are dissipated through the heat dissipation fins 21b. Generally, in an HUD device having a large display magnification of a display image, the density of light of the display image decreases. Therefore, it is necessary to use an LED having a high luminous intensity, which leads to an increase in generating heat in the LED. In addition, accordingly, the heat generated by the light absorbing action in the liquid crystal panel also increases.

In the image display unit 2 having the above configuration, when the liquid crystal panel 22 is driven by a control unit, not shown in the drawing, a predetermined image is displayed in the effective display region 22a of the liquid crystal panel 22. Here, corresponding to the image I shown in FIG. 1, the speedometer image and the navigation image are displayed side by side in the left-right direction, as schematically shown in FIG. 5. In addition, at the same time, the LED 23a emits light, and white light emitted from the LED 23a is applied to the effective display region 22a. The white light emitted from the LED 23a is reflected off the inner wall of the light source chamber 21a, and thus the white light as backlight having a uniform luminance distribution is applied to the effective display region 22a. As a result, the light transmitted through the displayed image I, i.e., the image light L is emitted from the liquid crystal panel 22.

As described above, when the light of the LED 23a is transmitted through the liquid crystal panel 22, a part of the light is converted into heat by the liquid crystal panel 22, and heat is generated by the LED 23a emitting light. The heat is transferred to the case 21, and a part of the heat is transferred to the case 21 through the cover 24, further transferred to the heat dissipation fins 21b as a heat sink formed in the case 21, and dissipated from the heat dissipation fins 21b. Specifically, in the entire region of the liquid crystal panel 22, the ineffective display region 22b excluding the effective display region 22a is in close contact with the case 21 and the cover 24 through the heat transfer sheets 25 and 26, and thus it is possible to increase the heat dissipation area in the liquid crystal panel 22 as large as possible, and it is possible to enhance the heat dissipation effect. By this heat dissipation, a temperature rise in the liquid crystal panel 22 is restrained, and the thermal reliability of the liquid crystal panel 22 is improved.

Figure 6:
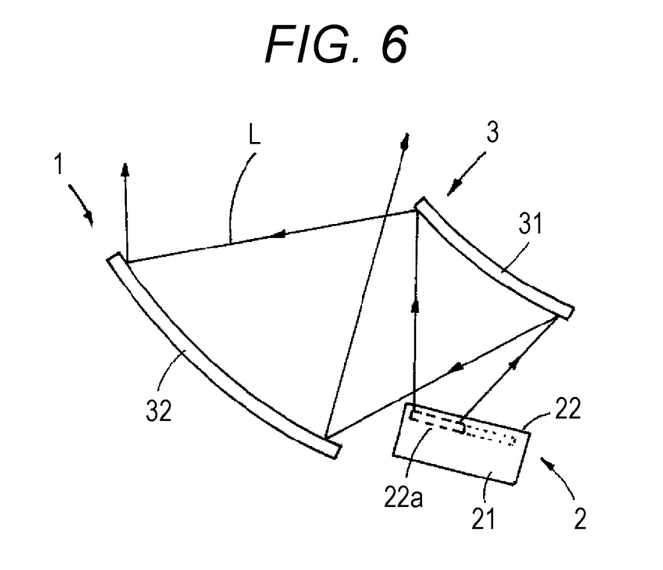
FIG. 6 is a schematic side view showing a positional relationship between the image display unit and an optical system of the HUD device.

As shown in FIG. 2, the image display unit 2 having this configuration is disposed in the lower region of the convex mirror 31 of the optical system 3. FIG. 6 is a schematic enlarged side view showing a positional relationship between the image display unit 2 and the optical system 3. Based on the front-rear direction of the automobile, the image display unit 2 is disposed obliquely downward in front of the convex mirror 31, and image light emitted from the effective display region 22a of the liquid crystal panel 22 is projected onto the convex mirror 31. The projected image light is reflected toward the front at the convex mirror 31, projected onto the concave mirror 32, reflected, and projected onto the windshield WS of the automobile through the upper surface opening H of the dashboard DB. Therefore, the image light from the liquid crystal panel 22 is projected onto the windshield WS through the optical path in a folded state along the front-rear direction of the automobile.

Figure 7:
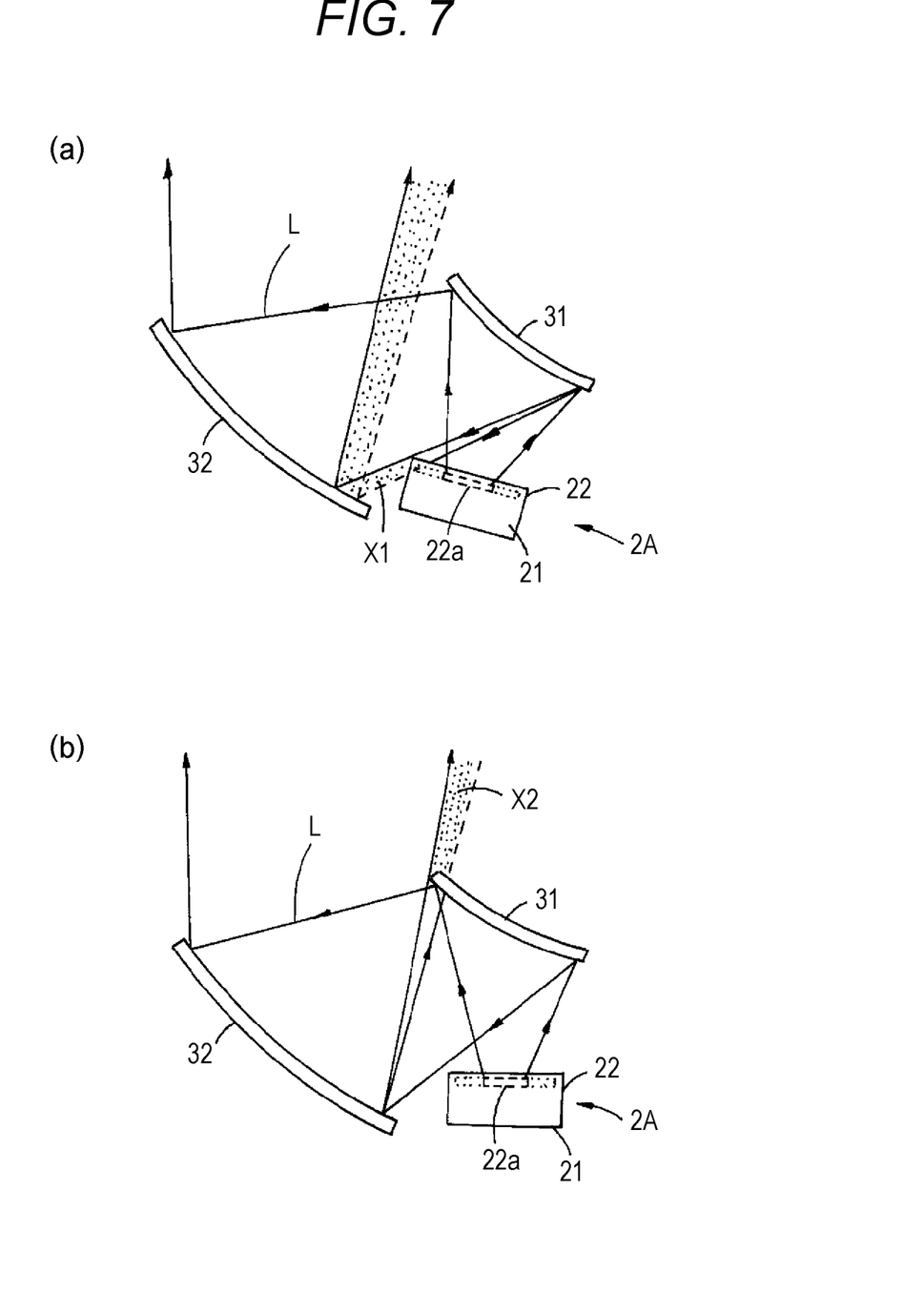

Here, as shown in a first reference example in FIG. 7(a), when an image display unit 2A is disposed close to the lower region of the convex mirror 31, a part X1 of the image display unit 2A may enter the optical path of the image light L, and a part of the image light L may be shielded. That is, as dotted in FIG. 7(a), a part of the image light L emitted from the effective display region 22a of the liquid crystal panel 22 is shielded and is not projected onto the windshield WS, and thus suitable image display may not be performed. Specifically, in the image display unit 2A in which the effective display region 22a is set in the central region in the up-down direction of the screen of the liquid crystal panel 22 or in the screen upward direction, when the effective display region 22a is set at a predetermined position to the convex mirror 31, the image display unit 2A is disposed at a position close to the side of the concave mirror 32, and the part X1 of the image display unit 2A is prone to enter the optical path of the image light L.

When the position of the image display unit 2A or the convex mirror 31 is adjusted in order to prevent a part of the image display unit 2A from entering the optical path of the image light L reflected off the convex mirror 31 as described above, a part X2 of the convex mirror 31 may enter the optical path of the image light L reflected off the concave mirror 32 this time as shown in a second reference example in FIG. 7(b). Also in this case, as dotted in FIG. 7(b), a part of the image light L projected onto the windshield WS is shielded, and suitable image display fails to be performed. Specifically, when the radius of curvature of the concave mirror 32 is increased in order to increase the magnification ratio of the image to be displayed, the region of the optical path of the image light L is widened accordingly, and the part X2 of the convex mirror 31 is prone to enter the optical path.

In the image display unit 2 of the above-described embodiment, the effective display region 22a of the liquid crystal panel 22 is placed in a region on a side close to one end corresponding to the screen downward direction of the image display unit 2. Then, the image display unit 2 is placed in an attitude in which the one end is directed to the side on which the image light L is reflected off the convex mirror 31, i.e., directed to the concave mirror 32 side disposed in front. In other words, when a predetermined normal is assumed on the reflective surface of the convex mirror 31, the liquid crystal panel 22 is placed on one side of the normal, the concave mirror 32 is disposed on the other side of the normal, and the effective display region 22a of the liquid crystal panel 22 is placed in an attitude directed toward the side close to the normal.

Therefore, even in the case in which image display unit 2 is placed such that the effective display region 22a is located at a predetermined position to the convex mirror 31, a part of the image display unit 2 is not significantly caused to project forward to the convex mirror 31. That is, even in the case in which the image display unit 2 is disposed such that the effective display region 22a has a predetermined positional relationship to the convex mirror 31, the part on the front side of the image display unit 2 is prevented from entering the optical path of the image light L reflected off the convex mirror 31 as compared with the first and the second reference example shown in FIGS. 7(a) and 7(b).

As a result, as in the first reference example, a part of the image light L reflected off the convex mirror 31 is prevented from being shielded by the image display unit 2, and suitable image display can be performed. In addition, by doing so, it is possible to reduce the facing interval dimension between the convex mirror 31 and the image display unit 2, which is advantageous for downsizing the HUD device 1. At the same time, the convex mirror 31 can be downsized, and the convex mirror 31 can be prevented from entering the optical path of the image light L reflected off the concave mirror 32 as in the second reference example. Therefore, the radius of curvature of concave mirror 32 is reduced in order to increase the magnification ratio of the image to be displayed, and suitable image display can be performed even though the end of concave mirror 32 projects in the direction of the display device 2.

Figure 8:
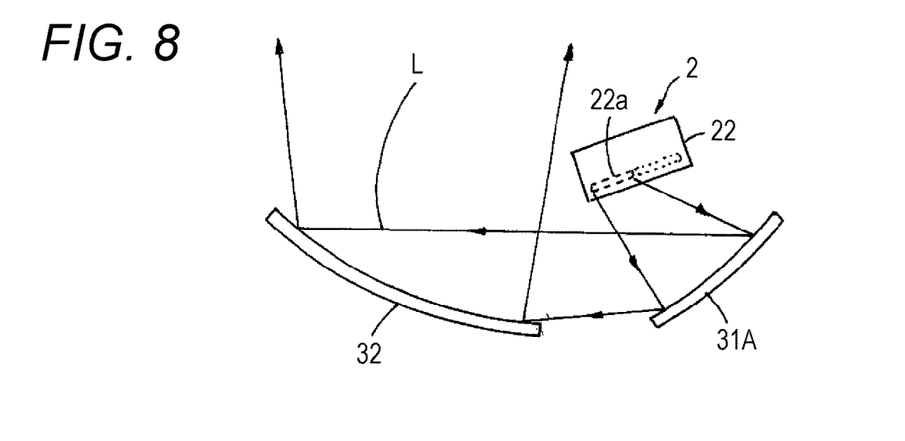
FIG. 8 is a schematic side view of a modification example of the HUD device.

In the present invention, as shown in a modification example of the HUD device in FIG. 8, the first reflector may be formed of a concave mirror 31A. Alternatively, although not shown in the drawing, the first reflector may be formed of a plane mirror. In the modification example of FIG. 8, the concave mirror 31A is referred to as a first concave mirror, and the concave mirror 32 same as that in the above embodiment is referred to as a second concave mirror. As described above, in the case in which the convex mirror is formed of the first concave mirror 31A, the up-down positional relationship between the image display unit 2 and first concave mirror 31A can be reversed. As a result, the image light of the image display unit 2 reflected off the first concave mirror 31A has a substantially horizontal optical path, and the image display unit 2 is not prone to enter the respective optical paths of the image light L reflected off the first concave mirror 31A and the image light L reflected off the second concave mirror 32. Therefore, the interval dimension between the image display unit 2 and first concave mirror 31A can be further reduced. The form including the first concave mirror 31A is suitable for application to an HUD device in which the radius of curvature of the second concave mirror 32 is made large enough.

Figure 9:
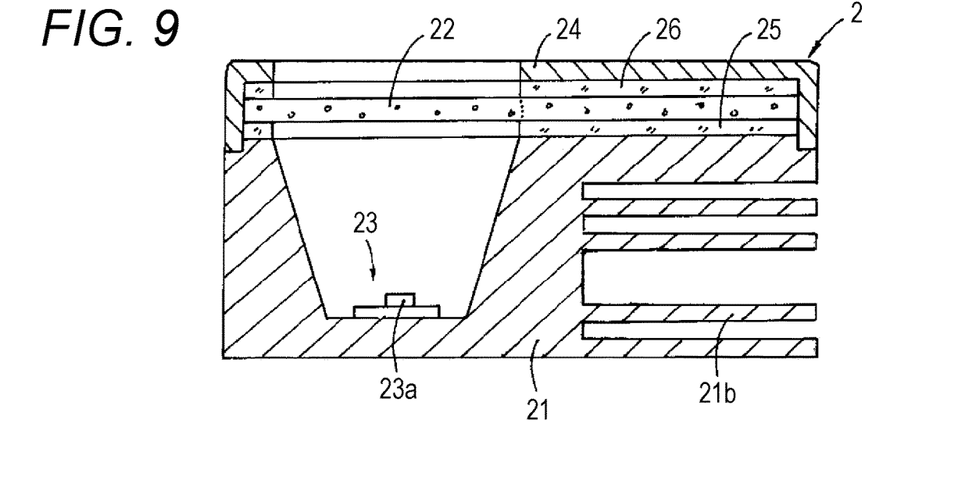
FIG. 9 is a longitudinal sectional view of a first modification example of the image display unit.

In addition, in the present invention, although the case 21 of the image display unit 2 is an optical system of a reflection type, the case 21 can be appropriately changed to a refraction type such as a lens. Furthermore, the heat dissipation structure formed in the case 21 can be appropriately changed. In the following modification examples, parts equivalent to those of the above embodiment are denoted by the same reference numerals, and the detailed description is omitted. FIG. 9 is a longitudinal sectional view of a first modification example of the image display unit 2. The interval and number of the heat dissipation fins 21b formed in the case 21 are partially different. In addition, although not shown in the drawing, the dimensions of the heat dissipation fins may be partially different. Although not shown in the drawing, the case 21 and the heat dissipation fins 21b may be partially changed to a material having a low heat conductivity. By appropriately designing the form of the heat dissipation fins 21b in this manner, the heat dissipation distribution in the case 21 is controlled, and a suitable heat dissipation effect in each of the LED 23a and the liquid crystal panel 22 can be obtained.

Figure 10:
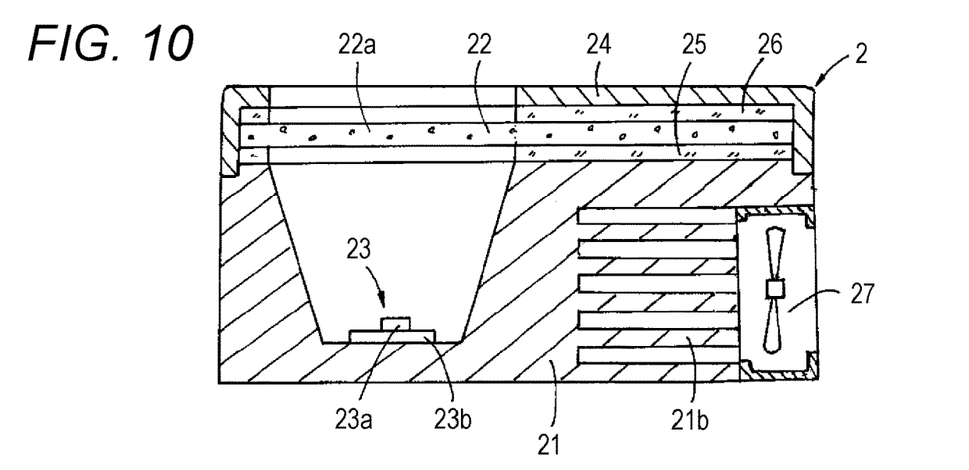
FIG. 10 is a longitudinal sectional view of a second modification example of the image display unit.

FIG. 10 is a longitudinal sectional view of a second modification example of the image display unit 2. At a position facing the heat dissipation fins 21b formed in the case 21, a heat dissipation fan 27 is attached. When the image display unit 2 is driven, the heat dissipation fan 27 is driven synchronously, and thus a heat dissipation effect in the case 21, i.e., the heat dissipation fins 21b can be enhanced. The heat dissipation fan 27 can be similarly applied to the case 21 of the image display unit 2 of the first modification example shown in FIG. 9.

Figure 11:
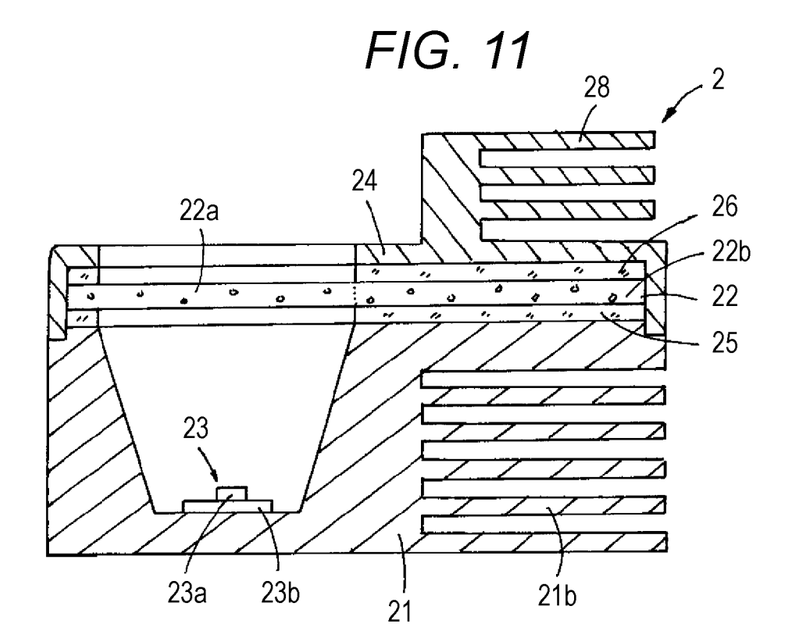
FIG. 11 is a longitudinal sectional view of a third modification example of the image display unit.

FIG. 11 is a longitudinal sectional view of a third modification example of the image display unit 2. In a part of the cover 24, an auxiliary heat dissipation fin 28 is integrally formed. That is, one or more auxiliary heat dissipation fins 28 are integrally formed on a part of the surface of the cover 24, specifically in a region corresponding to the ineffective display region 22b of the liquid crystal panel 22. In this configuration, the heat generated in the liquid crystal panel 22 is transferred from the ineffective display region 22b to the cover 24, and is dissipated from the auxiliary heat dissipation fin 28. As described above, heat is dissipated from the ineffective display region 22b having a relatively large area, and thus the heat dissipation effect is enhanced. The auxiliary heat dissipation fin 28 is placed so as not to interfere with other components such as the convex mirror 31 when placed in the HUD device 1.

Figure 12:
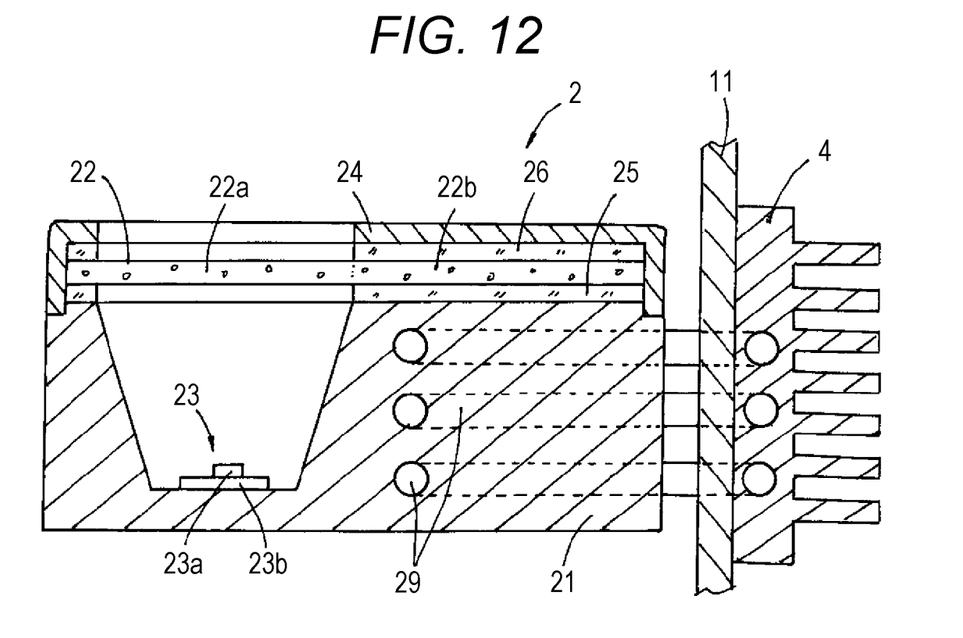
FIG. 12 is a longitudinal sectional view of a fourth modification example of the image display unit.

FIG. 12 is a longitudinal sectional view of a fourth modification example of the image display unit 2. No heat dissipation fin is formed in the case 21, and the case 21 is thermally connected through a heat pipes 29 to a separate heat sink 4 separately formed. Here, the separate heat sink 4 is placed outside a housing 11 of the HUD device 1 that internally houses the image display unit 2. The case 21 and the separate heat sink 4 are connected to each other through the heat pipe 29 that extends penetrating the housing 11. Heat generated in the LED 23a and the liquid crystal panel 22 is transferred from the case 21 to the separate heat sink 4 through the heat pipe 29, and is dissipated from the separate heat sink 4. Since the separate heat sink 4 is disposed outside the housing 11, the heat dissipation effect is further enhanced. Similarly to the fourth modification example, the separate heat sink 4 may be connected from the cover 24 through the heat pipe 29 to enhance the heat dissipation effect.

In the embodiment and the modification examples described above, the heat transfer sheets 25 and 26 provided in the image display unit 2 are preferably members having a high heat conductivity and having an effect of absorbing stress between the liquid crystal panel 22 and the case 21 and between the liquid crystal panel 22 and the cover 24, and for example, heat transfer grease may be used. However, when the heat transfer grease is used, it can be easily imagined that the grease flows out due to the influence of the use environment or the like, and a defect of adhesion to the effective display region 22a occurs. Therefore, it goes without saying that a structure which prevents outflow is provided at the boundary between the effective display region and the heat transfer sheets 25 and 26.

In the present invention, since the display panel of the image display unit 2 only has to have a configuration that emits image light corresponding to an image to be displayed, the display panel may be configured of a DMD device in which micro mirrors are disposed in a matrix to selectively reflect light of a light source and emit the image light. Alternatively, it may be composed of an organic EL or an electrochromic element.

The windshield in the present invention is not limited to the windshield of an automobile described in the embodiment, and may be a part of a vehicle body such as a translucent window provided in a vehicle.

The present international application claims priority based on Japanese Patent Application No. 2020-098086 filed on Jun. 5, 2020, and the entire contents of Japanese Patent Application No. 2020-098086 are incorporated herein by reference.

The description of the specific embodiments of the present invention is presented for the purpose of illustration. The specific embodiments are not intended to be exhaustive or to limit the invention as it is in the form described. It is obvious to those skilled in the art that many modifications and alterations are possible in light of the contents of the description above.

LIST OF REFERENCE SIGNS

1 HUD device
2 Image display unit
3 Optical system
4 Separate heat sink
21 Case
21b Heat dissipation fin
22 Display panel (liquid crystal panel)
22a Effective display region 22b Ineffective display region
23 Backlight source
23a LED (Light Emitting Diode)
24 Cover
25, 26 Heat transfer sheet
27 Heat dissipation fan
28 Auxiliary heat dissipation fin
29 Heat pipe
31 First reflector (convex mirror)
32 Second reflector (concave mirror)
WS Windshield
L Image light
I Virtual image (display image)

What is claimed is:

1. A vehicle display device comprising:
an image display unit including a liquid crystal panel that displays an image; and
an optical system that projects image light of the displayed image onto a windshield of a vehicle,
wherein a virtual image of the image is visually recognized by light reflected off the windshield,
an image display surface of the liquid crystal panel includes an effective display region that displays the image, an ineffective display region that does not contribute to the displaying the image, and a peripheral edge region,
when an up-down direction of the image is an up-down direction of the image display surface,
the effective display region is set to a region on a side close to one end corresponding to a lower side direction of the image display surface,
the ineffective display region is set to a region corresponding to an upward direction of the image display surface compared to the effective display region,
the effective display region and the ineffective display region are adjacent to each other in the up-down direction of the image display surface, and
the peripheral edge region surrounds the effective display region and the ineffective display region.

2. The vehicle display device according to claim 1, wherein
the optical system includes:
a first reflector that reflects image light emitted from the image display unit; and
a second reflector that reflects reflected light of the first reflector toward the windshield, and
an optical path of image light from the image display unit to the second reflector is set in a folded state.

3. The vehicle display device according to claim 2, wherein
the first reflector includes any one of a convex mirror, a plane mirror, and a concave mirror, and
the second reflector includes a concave mirror.

4. The vehicle display device according to claim 2, wherein
the image display unit is disposed to face the first reflector, and
the liquid crystal panel is disposed in an attitude in which the one end corresponding to a lower side direction of the image display surface faces the second reflector side.

5. The vehicle display device according to claim 2 wherein
when a normal is assumed on a reflection surface of the first reflector, the image display unit is disposed on one side of the normal, and the second reflector is disposed on another side of the normal, and
the image display unit is disposed such that the one end corresponding to a lower side direction of the image display surface of the liquid crystal panel faces a side close to the normal.

6. The vehicle display device according to claim 1, wherein
at least a part of the liquid crystal panel is supported on a case, and
a light source used for backlight of the liquid crystal panel and a heat sink are placed in the case.

7. The vehicle display device according to claim 6, wherein in the liquid crystal panel, within an entire region of the image display surface, an ineffective display region and the peripheral edge region are thermally coupled to the heat sink through a heat transfer sheet.

8. The vehicle display device according to claim 6, wherein the heat sink includes a heat dissipation fin formed in a part of the case.

9. The vehicle display device according to claim 8, further comprising a heat dissipation fan disposed to face the heat dissipation fin.

10. The vehicle display device according to claim 6, wherein
a heat pipe is connected to the case, and
the case is connected to a heat sink that is formed separately from the case through the heat pipe.

11. The vehicle display device according to claim 1, further comprising
a case that includes the optical system in a light source chamber;
a light source used for backlight of the liquid crystal panel placed in the case;
a cover that covers the liquid crystal panel corresponding to the ineffective display region and the peripheral edge region from a side opposite from a side of the liquid crystal panel facing the case;
a first heat transfer sheet disposed between the cover and the liquid crystal panel corresponding to the ineffective display region and the peripheral edge region; and
a second heat transfer sheet disposed between the liquid crystal panel and the case corresponding to the ineffective display region and the peripheral edge region,
wherein the first heat transfer sheet and the second heat transfer sheet comprise an elastic material having a high thermal conductivity configured to equalize an external force applied to the liquid crystal panel and transfer heat from the light source to the case.

12. The vehicle display device according to claim 6, further comprising
a cover that covers the liquid crystal panel corresponding to the ineffective display region and the peripheral edge region from a side opposite from a side of the liquid crystal panel facing the case;
a first heat transfer sheet disposed between the cover and the liquid crystal panel corresponding to the ineffective display region and the peripheral edge region; and
a second heat transfer sheet disposed between the liquid crystal panel and the case corresponding to the ineffective display region and the peripheral edge region,
wherein the first heat transfer sheet and the second heat transfer sheet comprise an elastic material having a high thermal conductivity configured to equalize an external force applied to the liquid crystal panel and transfer heat from the light source to the heat sink in the case.

* * * * *